United States Patent
Milanese et al.

[11] Patent Number: 5,930,349
[45] Date of Patent: Jul. 27, 1999

[54] COMMAND SIGNALS GENERATOR CIRCUIT FOR TELEPHONIC FEES INDICATORS

[75] Inventors: Carlo Maria Milanese, Olevano; Mauro Pasetti, Milan, both of Italy

[73] Assignee: SGS-Thomson Microelectronics S.r.l., Agrate Brianza, Italy

[21] Appl. No.: 08/921,091

[22] Filed: Aug. 29, 1997

[30] Foreign Application Priority Data

Aug. 30, 1996 [EP] European Pat. Off. ............ 96830456

[51] Int. Cl.⁶ .................. H04M 3/00; H04M 15/18
[52] U.S. Cl. .................. 379/350; 379/124; 379/399; 327/337
[58] Field of Search ............... 379/350, 124, 379/251, 322, 399, 413, 237, 154, 318, 652; 307/112, 113; 327/337, 344

[56] References Cited

U.S. PATENT DOCUMENTS

| | | | |
|---|---|---|---|
| 4,211,896 | 7/1980 | Ferrieu | 379/124 |
| 4,485,270 | 11/1984 | Honda et al. | 379/124 |
| 4,638,122 | 1/1987 | Siligoni et al. | 379/124 |
| 4,720,852 | 1/1988 | Siligoni et al. | 379/124 |
| 5,172,407 | 12/1992 | Alenius | 379/124 |
| 5,387,874 | 2/1995 | Rapeli | 327/337 |
| 5,862,213 | 1/1999 | Klamt et al. | 379/413 |

FOREIGN PATENT DOCUMENTS

| | | |
|---|---|---|
| 0 145 038 | 6/1985 | European Pat. Off. . |
| 0 483 088 | 4/1992 | European Pat. Off. . |
| 2 563 957 | 11/1985 | France . |

*Primary Examiner*—Forester W. Isen
*Assistant Examiner*—Jacques Saint-Surin
*Attorney, Agent, or Firm*—Jenkens & Gilchrist P.C.

[57] ABSTRACT

The present invention relates to a control signal generation circuit for telephone charge indicators comprising a capacitor having a first and a second terminals connected to ground through respectively a first and a second switches with the first terminal of the capacitor being also connected through a third switch to a constant current generator which is connected to a positive power supply line with respect to ground. The second terminal of the capacitor is connected to a constant current generator which is connected to a negative power supply line with respect to ground. The first and second terminals are also connected through respectively a first and a second resistance to a circuit node coupled to an output terminal.

18 Claims, 4 Drawing Sheets

COMMAND SIGNALS GENERATOR CIRCUIT FOR TELEPHONIC FEES INDICATORS

FIELD OF THE INVENTION

The present invention relates to signal generating telephone circuits for indicating to the subscriber the charge for any current telephone connection and, in particular, telephone circuits which can be integrated monolithically as control signal generators for the charge indicators at the subscriber's premises and designed to constitute, together with the subscriber's line speech circuit, an interface between the subscriber's telephone line and exchange control mechanisms or organs.

BACKGROUND OF THE INVENTION

A subscriber's telephone line is powered by a continuous voltage generator in series with which are connected other voltage signal generators such as the speech band call signals, ringing signals and subscriber charge indicating signals.

To the terminals of the line are connected in mutual parallel both the call circuit and the ringing circuit of the subscriber's telephone equipment and other devices, if any, inside or outside the equipment, such as, e.g., a progressive counting indicator for the current telephone connection charge which is calculated by the dedicated exchange mechanisms or organs.

The subscriber's charge indicators are driven as mentioned above by the telephone exchange through the same telephone line by means of dedicated control signals termed normally "charge signals."

These control signals cannot be provided as signals having a pulsed wave form, because in this case, the rising and falling fronts of the pulses would create harmonics such as to disturb not only the line subscriber but also the subscribers of the neighboring lines.

In practice, alternating voltage signals are used having a limited duration in time (approximately 100 msec) and frequency (12 or 16 kHz) much greater than that of the call telephone signals (0.3+3.4 kHz) with relatively long signal level rise and fall times (approximately 10 ms).

There are electromechanical solutions in which the "charge signals" are formed and sent directly on line by means of exchange devices comprising a resonant circuit coupled inductively through a transformer to the subscriber's telephone line and activated for certain time periods. The behavior of the signal level increase and decrease is exponential.

The solution seen above is also relatively costly and requires tuning the resonant circuit exactly to the desired frequency.

In U.S. Pat. Nos. 4,638,122 and 4,720,852 of this applicant, there are indicated solutions better suited to the requirements of modern electronic telephone systems and describing control signal generating telephone circuits for the subscriber's charge indicators and suited to being integrated monolithically and constituting together with the subscriber's line speech circuit an interface between the subscriber's telephone line and the exchange control organs.

In the former of the above-mentioned United States patents is described a telephone circuit which is a monolithically integrable generator of control signals for the charge indicators and is coupled to an alternating voltage signal generator having predetermined amplitude and frequency constant in time and comprises a generator of voltage signals spaced in time and having a pulsed trapezoid wave-form. Therein a multiplying circuit finds the product of the signals supplied by the two generators to supply a signal which is sent to the subscriber's line speech circuit and added to the call signals.

It also comprises circuit means designed to take an image signal of the whole signal adapted to the line, a high-pass filter to eliminate the call signal components, a rectifier circuit for rectifying the filtered signal, and a comparator for comparing the rectified signal with the reference signal. If the amplitude of the rectified signal is greater than the amplitude of the reference signal the comparator generates a signal capable of causing stopping of the level increase of the pulsed trapezoid signals to regulate amplitude.

In the latter of the above-mentioned United States patents another telephone circuit is described. The telephone circuit is a monolithically integrable generator of control signals for the charge indicators and is coupled to an alternating voltage signal generator having predetermined amplitude and frequency constant in time and comprises a generator of voltage signals spaced in time and having a pulsed trapezoid wave-form. In the latter also, a multiplying circuit finds the product of the signals supplied by the two generators to supply a signal which is added to the call signals and sent to the subscriber's line speech circuit (VC).

The generator of signals having a pulsed trapezoid wave-form comprises a capacitor which is charged and discharged by means of a voltage-current transducer of the non-linear type driven by the exchange control organs. The voltage at the ends of this capacitor constitutes the signal supplied by the generator of signals having trapezoid wave-form.

The transducer supplies a current proportional to the voltage applied to its input terminals for values of the latter between two predetermined threshold values opposite in sign and equal in absolute value and beyond which the current supplied remains constant as the input voltage changes.

The purpose of the present invention is to provide a monolithically integrable control signal generating telephone circuit for subscriber's charge indicators and designed to constitute together with the subscriber's line speech circuit, an interface between the subscriber's telephone line and exchange control organs which would be economically advantageous with respect to the devices of the prior art.

This purpose is achieved by the "charge signal" generating telephone circuit defined and characterized in the claims which conclude the present invention.

The characteristics and advantages of the present invention are set forth in the description of an embodiment thereof given below by way of non-limiting example with reference to the annexed drawings.

DETAILED DESCRIPTION OF A PREFERRED EMBODIMENT OF THE INVENTION

Figure 3:
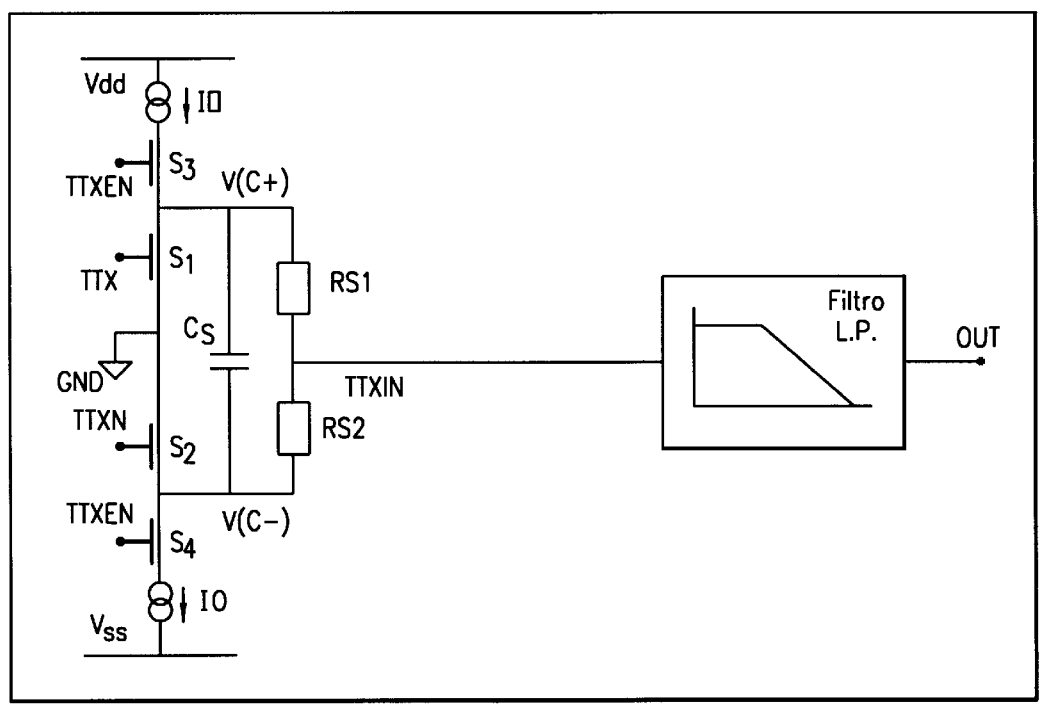
FIG. 3 shows the diagram of a telephone charge signal generating circuit in accordance with the present invention.

With reference to the above Figures, the telephone charge signal generating circuit shown in FIG. 3 comprises a capacitor CS which has a first terminal (C+) and a second terminal (C−) connected to a ground GND through respectively a first switch $S_1$ and a second switch $S_2$.

Figure 1:
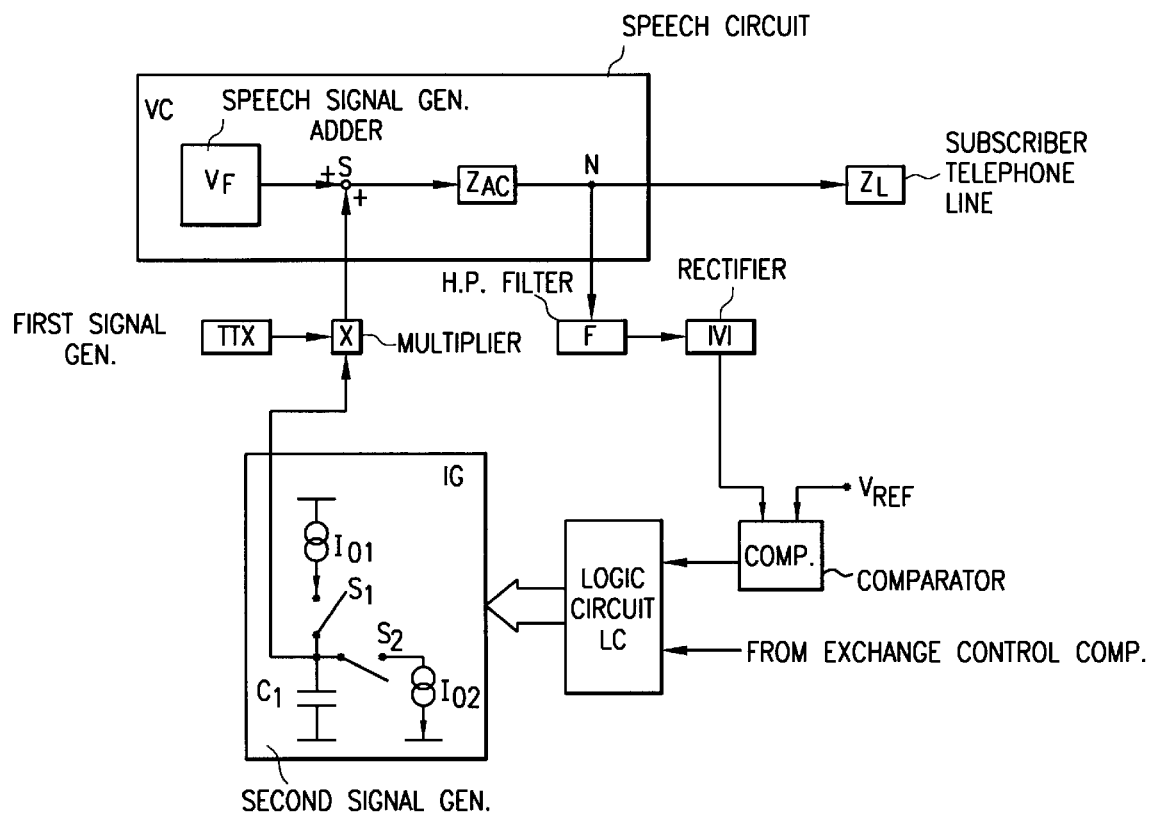
FIGS. 1 and 2 show the block diagrams of the monolithically integrable circuit solutions described above.
Figure 2:
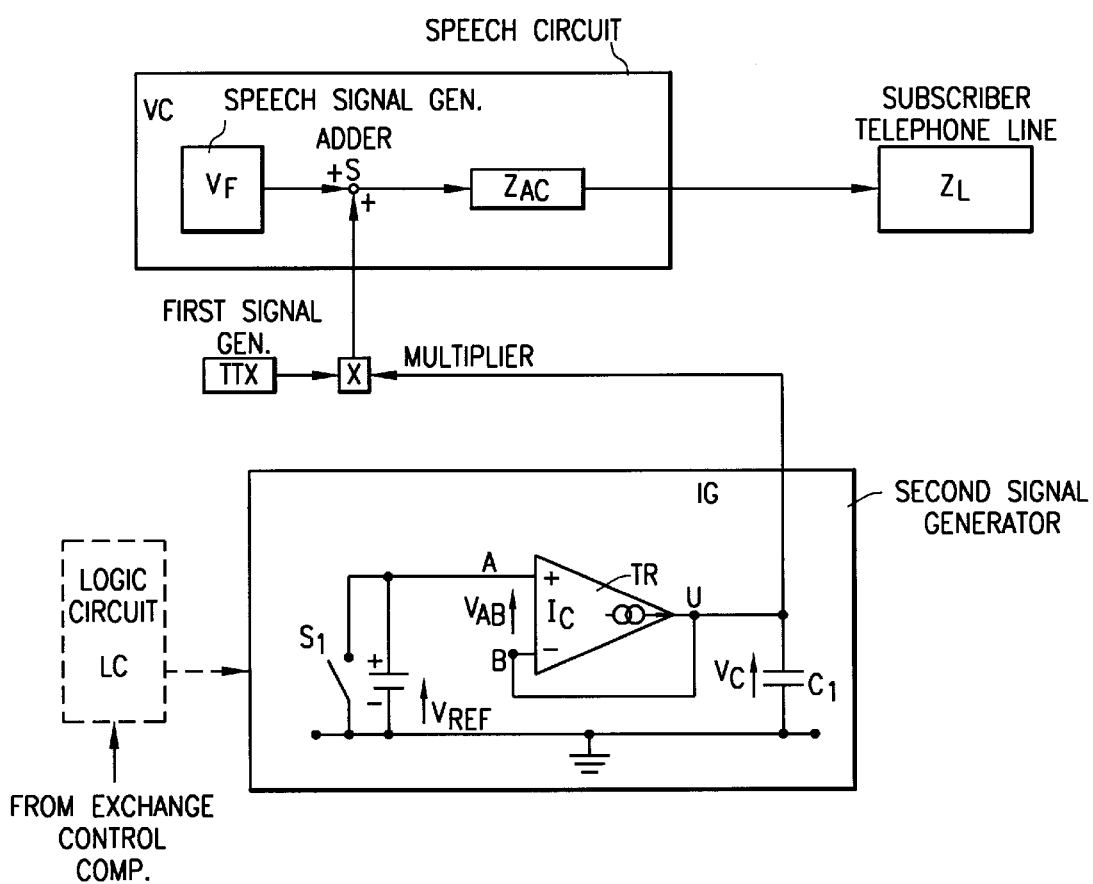

The first and second terminals of the capacitor CS are then connected respectively to a remaining current generator $I_o$ connected from a positive power supply line Vdd (typically +5 V with respect to ground) through a third switch S3 and to a constant current generator $I_o$ connected to a negative power supply line Vss (typically −5 V with respect to ground) through a fourth switch $S_4$. The terminals of the capacitor CS are connected through two resistances RS1 and RS2 to a circuit node which is coupled to an output terminal OUT for telephone charge signals through a low-pass filter L.P. These signals are added to the call signals as takes place in the prior art circuit solutions shown in FIGS. 1 and 2.

Using CMOS or mixed integration technologies the switches $S_1$, $S_2$, $S_3$ and $S_4$ are producible advantageously with field-effect transistors rather than two-pole transistors.

A telephone charge signal generating circuit in accordance with the present invention is usable naturally in the interface circuits (SLIC) of modern multi-subscriber exchanges, but it is particularly advantageous in local subscriber exchanges which are connected to a true telephone exchange not by means of a two-wire line but, for example, by radio waves. In this case, the subscriber's telephone line is very short with respect to the exchange telephone lines.

The simplicity of a circuit in accordance with the present invention makes it reliable and economically advantageous.

Figure 4:
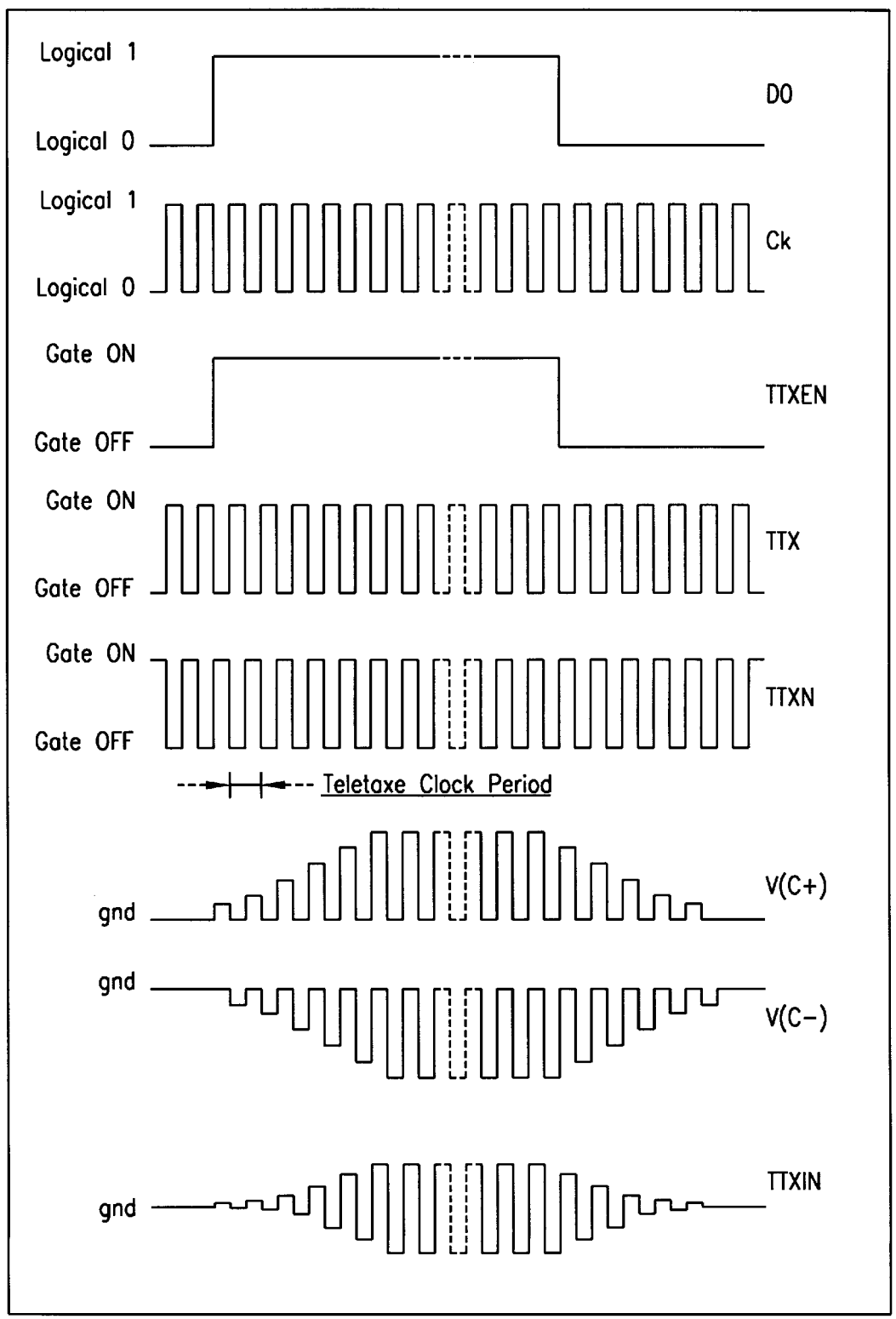
FIG. 4 shows the signal wave-form of the telephone circuit in accordance with the present invention.

FIG. 4 shows the wave-form of the various digital signals allowing driving of the circuit.

The signal $D_0$ is the one that causes the start and end of generation of the charge signal starting from a periodic signal Ck having a regular square wave-form. The signals $D_0$ and Ck come generally from outside the circuit, e.g., from a microprocessor controlling the subscriber's exchange or local exchange system.

In a manner known to those skilled in the art by means of standard circuits not shown in FIG. 3, there are generated the internal signals TTX, TTXN and TTXEN which supply the voltage levels necessary for turning on and off the MOS transistors with which the switches are implemented.

FIG. 4 shows the wave-forms of the signals at the ends of the capacitor, V(C+) e V(C−), and output, TTXIN.

The circuit shown in FIG. 3 creates directly the control signal for the charge indicators starting from two digital signals which set the frequency of the sinusoidal carrier (signal TTX in FIG. 3) and the duration of the pulse (signal TTXEN). The denied signal TTXN is taken from TXX.

With rated operation, there is no charge signal, and the signal TTXEN is such as to break the connection between the two current generators from the rest of the circuit. In this situation, CS is discharged and V(C+)=V(C−)=V(TTXIN)=0.

As soon as TTXEN changes state (instant t=t0), the two current generators are connected to the circuit and start to charge the capacitor CS. During the phase when TTX is active, the switch S1 connects V(C+) to ground, S2 remains open and the voltage V(C−) depends on the charge stored on the capacitor CS. The current traversing S1 is null (this observation derives from Kirchoff's laws at the nodes, V(C+) e V(C−)). The same remarks apply for the phase in which TTXN is active, except that in this case, S2 connects V(C−) to ground and S1 is open. The voltage at the ends of the capacitor (V(C+)−V(C−)) is:

$$Vc(t)=2\ RS\ I0\ (1-\exp((t-T0)/2\ RS\ CS).$$

The voltages V(C+) e V(C−) vary, following the signals TTX and TTXN, respectively, between 0 and Vc and between −Vc and 0. The signal V(TTXIN) is a square wave having average value null and envelope ½ Vc(t). When TTXEN returns to the initial state S3 and S4 break the connection of the current generators, the capacitor CS discharges on RS1 and RS2 with the same time constant, i.e.:

$$\tau=2\ RS\ CS$$

The pulse tail is a decreasing exponential.

The signal TTXIN then passes into a low-pass filter which has appropriate cut-off frequency and eliminates the harmonics higher than the resulting square wave signal.

The advantages of a circuit in accordance with the present invention with respect to the prior art circuits are circuit simplicity and ease of integration with CMOS components. In addition it requires only logical input signals (it does not require a fixed-amplitude sinusoidal signal) and, from the application point of view, allows programming amplitude and rise-fall time of the pulse through the choice of the values RS1, RS2 and CS while leaving full freedom of choice to the final user.

It is possible to make modifications and replacements to the embodiment described above in a manner known to those skilled in the art.

What is claimed is:

1. Control signal generation circuit for telephone charge indicators comprising:

a capacitor having a first and a second terminals connected to ground through respectively a first switch and a second switch with the first terminal of the capacitor being also connected through a third switch to a constant current generator which is connected to a positive power supply line with respect to ground and the second terminal of the capacitor being connected to a constant current generator which is connected to a negative power supply line with respect to ground and with said first and second terminals also being connected through respectively a first and a second resistance to a circuit node coupled to an output terminal.

2. A circuit in accordance with claim 1, wherein said circuit node is coupled to the output terminal through a low-pass filter.

3. A circuit in accordance with claim 2, wherein each switch is a field-effect transistor.

4. A circuit in accordance with claim 3 wherein the circuit is at least partly integrated by MOS or "mixed" technology.

5. A circuit in accordance with claim 1, wherein each switch is a field-effect transistor.

6. A circuit in accordance with claim 5 wherein the circuit is at least partly integrated by MOS or "mixed" technology.

7. An interface circuit for a telephone exchange comprising a circuit for generating control signals for charge indicators in accordance with claim 1.

8. An interface circuit for a telephone exchange comprising a circuit for generating control signals for charge indicators in accordance with claim 2.

9. An interface circuit for a telephone exchange comprising a circuit for generating control signals for charge indicators in accordance with claim 5.

10. An interface circuit for a telephone exchange comprising a circuit for generating control signals for charge indicators in accordance with claim 3.

11. An interface circuit for a telephone exchange comprising a circuit for generating control signals for charge indicators in accordance with claim 6.

12. An interface circuit for a telephone exchange comprising a circuit for generating control signals for charge indicators in accordance with claim 4.

13. An interface circuit for a subscriber's local exchange comprising a control signal generating circuit for charge indicators in accordance with claim 1.

14. An interface circuit for a subscriber's local exchange comprising a control signal generating circuit for charge indicators in accordance with claim 2.

15. An interface circuit for a subscriber's local exchange comprising a control signal generating circuit for charge indicators in accordance with claim 5.

16. An interface circuit for a subscriber's local exchange comprising a control signal generating circuit for charge indicators in accordance with claim 3.

17. An interface circuit for a subscriber's local exchange comprising a control signal generating circuit for charge indicators in accordance with claim 6.

18. An interface circuit for a subscriber's local exchange comprising a control signal generating circuit for charge indicators in accordance with claim 4.

* * * * *